(12) United States Patent
Sacchi

(10) Patent No.: US 7,022,242 B2
(45) Date of Patent: Apr. 4, 2006

(54) REDUCTION OF WASTEWATER IN PHOSPHATE MANUFACTURING

(76) Inventor: Richard Edwin Sacchi, 204 E. Terrace Dr., Plant City, FL (US) 33565

( * ) Notice: Subject to any disclaimer, the term of this patent is extended or adjusted under 35 U.S.C. 154(b) by 457 days.

(21) Appl. No.: 10/412,865

(22) Filed: Apr. 14, 2003

(65) Prior Publication Data

US 2004/0200581 A1 Oct. 14, 2004

(51) Int. Cl.
*C02F 1/16* (2006.01)
(52) U.S. Cl. ............... 210/747; 159/47.3; 210/765; 210/766; 423/321.1
(58) Field of Classification Search ............... 210/712, 210/718, 724, 725, 737, 747, 919; 423/321.1
See application file for complete search history.

(56) References Cited

U.S. PATENT DOCUMENTS

| | | | |
|---|---|---|---|
| 3,836,461 A * | 9/1974 | Whitehead et al. ......... 210/712 |
| 4,320,012 A | 3/1982 | Palm et al. |
| 4,483,772 A * | 11/1984 | Rolke et al. ............... 210/601 |
| 4,698,163 A | 10/1987 | Zibrida |
| 5,112,499 A | 5/1992 | Murray et al. |
| 5,316,748 A | 5/1994 | Palm et al. |
| 5,366,640 A | 11/1994 | Palm et al. |
| 6,235,257 B1 | 5/2001 | Palm et al. |
| 6,616,851 B1 * | 9/2003 | Sforza-Heinen et al. .... 210/774 |
| 6,733,654 B1 * | 5/2004 | Itzhak ....................... 205/742 |

* cited by examiner

*Primary Examiner*—Peter A. Hruskoci

(57) ABSTRACT

Use and reduction of wastewater or "pond water" created by the wet-process phosphoric acid manufacturing there is created a large amount of wastewater or "pond water" to substantially reduce or eliminate the discharge of pond water with contaminants to the environment. By partially treating pond water with known industry standard processes and using the treated pond water for use as required makeup or cooling water in an electric power generator or any other Industry requiring makeup, cooling or process water will substantially reduce or eliminate the need for the phosphoric acid manufacturers to discharge the contaminated water to the environment and reduce the quantity of fresh water that would normally be required by these other industries using the treated pond water for cooling or makeup water.

2 Claims, 1 Drawing Sheet

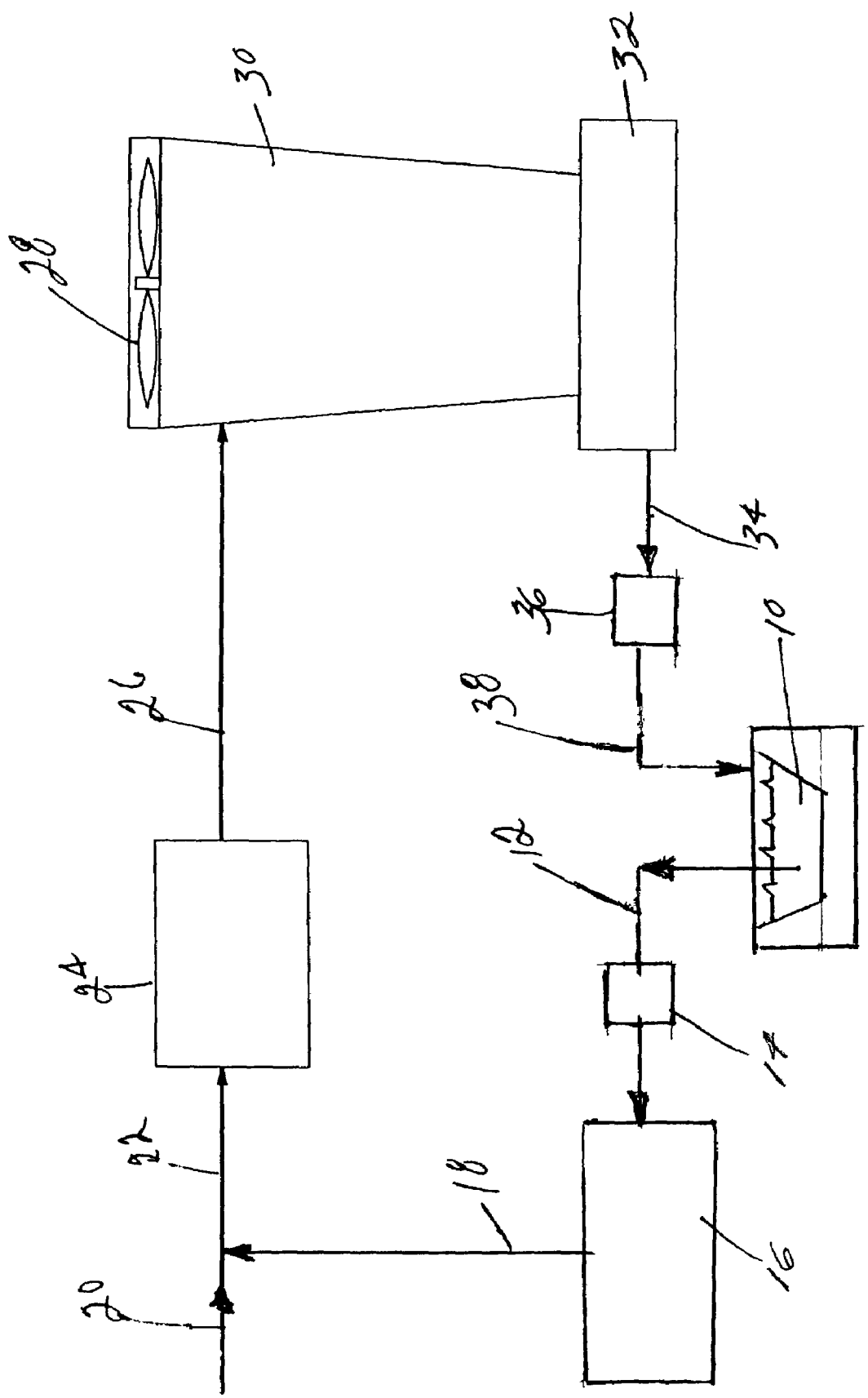

REDUCTION OF WASTEWATER IN PHOSPHATE MANUFACTURING

BACKGROUND OF THE INVENTION

In the phosphate mining complexes that manufacture wet process phosphoric acid, water is employed as a coolant for gas streams and other process uses within the complex. The water absorbs and dissolves various materials during these uses and is then sent to ponds for cooling. The pond water created is contaminated, acidic and is no longer able to be discharged to the surrounding environment due to various federal and state limits on many of the contaminants found in the pond water, including fluoride and phosphate compositions. Typical pond water has a pH in the range of 1.2–2.0, a phosphate content of 15,000–22,000 parts per million (ppm), fluoride compounds at a levels of 5000–10,000 ppm and total dissolved solids up to 50,000 ppm. As the phosphoric acid plant operates, the pond water continues to accumulate in large quantities until all storage capacity is exceeded. The phosphate manufacturer must then go through an expensive treatment process to meet federal and state limits before discharging the pond water to the environment.

The phosphate manufacturers create large ponds which are hundred of acres in size to contain and store the contaminated pond water and then rely on natural evaporation and expensive treatment processes to treat and then release the treated pond water to the surrounding environment. The invention can also reduce the amount of fresh water used by the power plant.

SUMMARY OF THE INVENTION

The invention provides a use for the pond water by partially treating the pond water and using the partially treated pond water as makeup or cooling water for an electric power producing plant or any other industry requiring makeup water or cooling water as opposed to expensive treatment of the pond water and discharging to the environment. This invention can also reduce the fresh water consumption of the plants using the treated pond water by using the partially treated water in place of the fresh water as makeup or cooling water. The cooling or makeup water may consist of 100% treated pond water or any mixture of fresh water and pond water required for operation of the plant.

The invention is thus a process which meets environmental regulations for the volume reduction of the acidic effluent from a wet process phosphoric acid plant wherein the steps of the process comprise neutralizing a suitable portion of the effluent from a storage pond for said acidic effluent so as to achieve a pH in the range from about 3.0 to about 5.0, diluting the portion with fresh water to obtain a dilute portion containing 10 to 40 parts by volume of the neutralized portion to 100 parts fresh water, contacting the cooling tower of a power plant with the dilute portion whereby a substantial amount of water is removed by evaporation, discharging the reduced effluent of said cooling tower back into said storage pond for reuse.

DESCRIPTION OF THE DRAWING

The drawing shows the treatment or neutralization of acidic pond water which is a by-product in the production of phosphates. The treated water is injected into a power plant for cooling purposes. Substantial amounts of water are removed from the pond water by use of a cooling tower with air circulation.

DETAILED DESCRIPTION OF THE INVENTION

The effluent from phosphate mining operations is pumped by pump 14 through a pipeline 12 to a conventional neutralization complex 16 where the effluent has its pH raised to a range of about 3.0 to about 5.0, preferably in the range from about 3.8 to about 4.8.

The treated effluent is then pumped (by a pump not shown) through pipeline 18 to another pipeline 22 where it is mixed with fresh water from pipeline 20. The amount of fresh water added is controlled by a valve (not shown) so as to achieve a preferred range of 10 to 40 parts of neutralized effluent to 100 parts of water. If desired, the fresh water can be eliminated.

In the power plant 24 the treated effluent is used to absorb excess heat. The heated effluent is then pumped through pipeline 26 to a cooling tower 30 which is equipped with one or more large fans 28. The fans pull ambient air through the hot effluent which removes heat and water vapor.

The cooled effluent falls into a tank 32. The pump 36 the pumps the effluent through pipelines 34 and 38 back into the pond water 10 with much less water content due to the evaporation taking place in the cooling tower 30.

I claim:

1. A process which meets environmental regulations for volume reduction of the acidic effluent having a pH in the range of 1.2–2.0 from a wet process phosphoric acid plant storage pond wherein the steps of the process comprise:
   a) neutralizing a portion of said effluent from the storage pond for said acidic effluent so as to achieve a pH in the range from about 3.0 to about 5.0,
   b) diluting said portion with fresh water to obtain a dilute portion, containing 10 to 40 parts by volume of said neutralized portion to 100 parts of fresh water
   c) using said dilute portion in a power plant to absorb excess heat and produce a heated effluent,
   d) contacting the heated effluent with ambient air in a cooling tower of said power plant, whereby a substantial amount of water is removed by evaporation, to reduce the volume of the heated effluent, and produce a cooled effluent,
   e) discharging the cooled effluent from said cooling tower back into said storage pond for reuse.

2. The method of claim 1 whereby the portion of said effluent from the storage pond is neutralized so as to achieve a pH in the range from about 3.8 to about 4.8.

* * * * *